(12) United States Patent
Hewavithana et al.

(10) Patent No.: US 11,856,081 B2
(45) Date of Patent: Dec. 26, 2023

(54) HIGH PRECISION TIMESTAMP DETECTION FOR IMPROVED CABLE MODEM CLOCK SYNCHRONIZATION

(71) Applicant: MAXLINEAR, INC., Carlsbad, CA (US)

(72) Inventors: Thushara Hewavithana, Chandler, AZ (US); Barak Hermesh, Pardes Hana M (IL)

(73) Assignee: MaxLinear, Inc., Carlsbad, CA (US)

(*) Notice: Subject to any disclaimer, the term of this patent is extended or adjusted under 35 U.S.C. 154(b) by 119 days.

(21) Appl. No.: 17/594,822

(22) PCT Filed: Apr. 15, 2020

(86) PCT No.: PCT/US2020/028198
§ 371 (c)(1),
(2) Date: Oct. 29, 2021

(87) PCT Pub. No.: WO2020/223013
PCT Pub. Date: Nov. 5, 2020

(65) Prior Publication Data
US 2022/0209931 A1    Jun. 30, 2022

Related U.S. Application Data

(60) Provisional application No. 62/839,959, filed on Apr. 29, 2019.

(51) Int. Cl.
*H04L 7/00* (2006.01)
*H04L 12/28* (2006.01)
(Continued)

(52) U.S. Cl.
CPC ........ *H04L 7/0033* (2013.01); *H04L 12/2801* (2013.01); *H04L 25/0212* (2013.01); *H04L 27/2662* (2013.01); *H04L 27/2695* (2013.01)

(58) Field of Classification Search
CPC ............... H04L 7/0033; H04L 12/2801; H04L 25/0212; H04L 27/2662; H04L 27/2695
(Continued)

(56) References Cited

U.S. PATENT DOCUMENTS

| 7,580,643 | B2 | 8/2009 | Moore et al. |
| 2005/0213693 | A1 | 9/2005 | Page |
| 2010/0166088 | A1* | 7/2010 | Arambepola ....... H04L 27/2665 375/348 |

FOREIGN PATENT DOCUMENTS

| EP | 2437450 A1 * | 4/2012 | ......... H04L 27/2663 |
| EP | 2437450 B1 | 10/2018 | |

(Continued)

OTHER PUBLICATIONS

International Search Report and Written Opinion in PCT/US2020/028198 dated Jul. 22, 2020.

*Primary Examiner* — Kevin M Burd
(74) *Attorney, Agent, or Firm* — Buchalter; Jason W. Croft

(57) ABSTRACT

The present disclosure is directed to timestamp detection using a cable modem and to a control apparatus, control device and control method for detecting time stamps in various signals such as orthogonal frequency division multiplexing (OFDM) signals. The control apparatus comprising processing circuitry being configured to obtain information a channel frequency response of the multi-path channel, the channel frequency response being based on a signal comprising a sequence of symbols. The processing circuitry is configured to transform the channel frequency response into a channel impulse response. The processing circuitry is configured to identify a peak in the channel impulse response. The processing circuitry is configured to determine a timestamp offset time between the peak in the channel impulse response and a trigger time indicative of a (Continued)

beginning of a symbol in the signal. The processing circuitry is configured to synchronize the device clock based on the timestamp offset time.

23 Claims, 7 Drawing Sheets

(51) Int. Cl.
*H04L 25/02* (2006.01)
*H04L 27/26* (2006.01)

(58) Field of Classification Search
USPC ......................................................... 375/260
See application file for complete search history.

(56) References Cited

FOREIGN PATENT DOCUMENTS

| | | |
|---|---|---|
| KR | 10-2010-0065077 A | 6/2010 |
| WO | 2018-010816 A1 | 1/2018 |
| WO | 2020/223013 A1 | 11/2020 |

* cited by examiner

HIGH PRECISION TIMESTAMP DETECTION FOR IMPROVED CABLE MODEM CLOCK SYNCHRONIZATION

FIELD

The present disclosure is directed to timestamp detection using a device, such as a cable modem and to a control method, apparatus and device for detecting timestamps in various signals, such as orthogonal frequency division multiplexing (OFDM) signals.

BACKGROUND

There have been recent initiatives to use Hybrid Fiber-Coaxial (HFC) based DOCSIS (Data Over Cable Service Interface Specification) networks as a backhaul for LTE (Long Term Evolution) and 5G cellular networks. This expands the use cases where Cable Modems (CM) can be deployed from the traditional in-home or business broadband services. For example, cable modems may be used to provide the backhaul functionality. This functionality places more strict requirements on timing synchronization between the cable modem (CM) and the Headend (CMTS—Cable Modem Termination System). CableLabs, the initiator of the DOCSIS specification, has been facilitating the activities around standardizing requirements to support Mobile Backhaul over DOCSIS (MBDOCSIS), as shown in Belal Hamzeh, et. al. DOCSIS Technologies for Mobile Backhaul, Cabelabs Technical Brief, May 2018. The proposed specification for the clock error of the cable modem, with respect to the CMTS clock, for MBDOCSIS is 100 nanoseconds, but there is a tangible market advantage to devices that can achieve better accuracy.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. While further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality. Unless otherwise defined, all terms (including technical and scientific terms) are used herein in their ordinary meaning of the art to which the examples belong.

Examples of the present disclosure relate to means for achieving timing synchronization that may enable a timing synchronization that is better than 100 nanoseconds. Examples may thus provide a high precision DOCSIS time stamp detection for improved cable modem clock synchronization.

Figure 1:
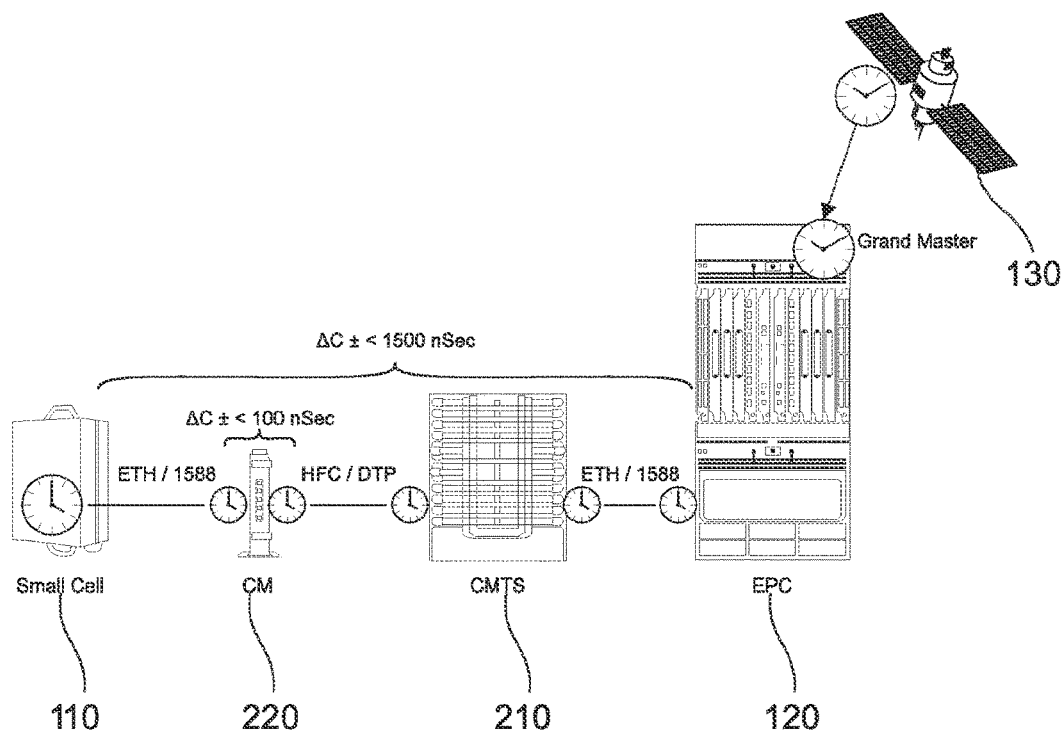
FIG. 1 shows a schematic diagram of an exemplary distributed clock architecture for MBDOCSIS.

In DOCSIS, clock synchronization is done using a distributed clock architecture as shown in FIG. 1. FIG. 1 shows a schematic diagram of an exemplary distributed clock architecture for MBDOCSIS. FIG. 1 shows a system comprising a small cell 110, a cable modem 220, a CMTS 210, an evolved packet core 120 and a Global Positioning System (GPS) satellite 130. For example, the cable modem 220 and the CMTS 210 may be part of a cable communication network 200, as shown in FIG. 2b. A reference clock of the CMTS 210 may be synchronized to a GPS Clock (e.g. via GPS satellite 130). This may be done by synchronizing the CMTS clock (via ethernet) to the Grand Master Clock in the Evolved Packet Core (EPC) 120 of a mobile network using the Precision Time Protocol (PTP-IEEE 1588 standard). As shown in FIG. 1, the EPC Grand Master clock may be directly synchronized to a GPS satellite clock. As for the CM clock, it may first synchronize to the CMTS clock rate by locking into a DOCSIS downstream channel. DOCSIS downstream channels originating from the CMTS may be generated using the CMTS reference clock and may therefore already be synchronized to global timing as described before. The CM may use a primary downstream channel for this purpose. The primary channel may be Single Carrier QAM (SC-QAM) or an OFDM channel, for example. The following description will be in the context of OFDM primary channels; however, the described methods and circuitries are also applicable to SC-QAM channels.

Once the CM clock rate is synchronized, CMTS and CM clock phases may be aligned using the DOCSIS Timing Protocol (DTP). The DTP involves message passing between the CMTS and the CM to establish the difference between CM and CMTS clock phases. The overall clock phase error for a cellular system is 1500 nSec. For DOCSIS to be used as mobile Backhaul, the CM contribution to the overall clock phase error should be less than 100 ns, as mentioned above.

One important PHY layer factor determining the clock synchronization accuracy achieved by DTP is how precisely the CM can assign timestamps to time domain OFDM primary signal samples. Other contributing factors such as inaccuracy in calibrating the delay of the time domain signal from the input to the CM to the point where OFDM symbols are triggered can be mitigated by careful hardware design in the CM. All these factors are important because in order for DTP to be accurately implemented, the delays in the CMTS to CM link should be specified so that the overall delay in CMTS to CM path can be accounted for to correctly adjust the CM clock to account for the delay from CM to CMTS.

There are two important areas to improving the accuracy of clock synchronization. A first may relate to accurately assigning a timestamp to the correct received sample which gives the CM the correct CMTS clock value at a given received signal sample point. The samples are delayed by the time it takes samples to travel from CMTS to CM OFDM sampling point. This delay is denoted as $d_{CMTS\_CM}$. Also important may be to accurately estimate the round-trip delay from the CMTS to the CM using DTP. Then by accounting for all different delay contributions from the CM, the CMTS, and the HFC channel, the adjustment, $d_{CMTS\_CM}$, needed to make to the timestamp so that it corresponds to the time the sample received at CM can be determined.

In some CMs, the timestamp is assigned to a selected OFDM sample based on an OFDM trigger point. The hardware may be capable of assigning the timestamp to a sample that is a fixed number of samples away from the trigger point. This offset may be set to half of a cyclic prefix based on the assumption the trigger point is in the middle of the cyclic prefix. The OFDM trigger point may be highly dependent on the Channel Impulse Response (CIR) of the channel between CMTS and CM. The trigger point may be assigned to reduce or minimize the inter symbol interference (ISI), taking into account length of cyclic prefix and transmit and receive window lengths. Hence there is no guarantee that the trigger point corresponds to a fixed point with respect to the main path of received multi-path signal. Hence, this technique introduces an arbitrary offset, which depends on channel impulse response, OFDM cyclic prefix, etc., to the timestamp. This means that the 100 ns accuracy mentioned above cannot be guaranteed.

The described systems, methods and circuitries aim to improve the accuracy of timestamp assignment by more precisely detecting the time domain sample that corresponds to the timestamp in the received OFDM signal. Once the correct time domain sample is identified, DTP can be used to estimate round trip delay and the calibration process can be used to estimate fixed delays in in the system such as CM signal delay from AFE to OFDM sample point.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Figure 2A:
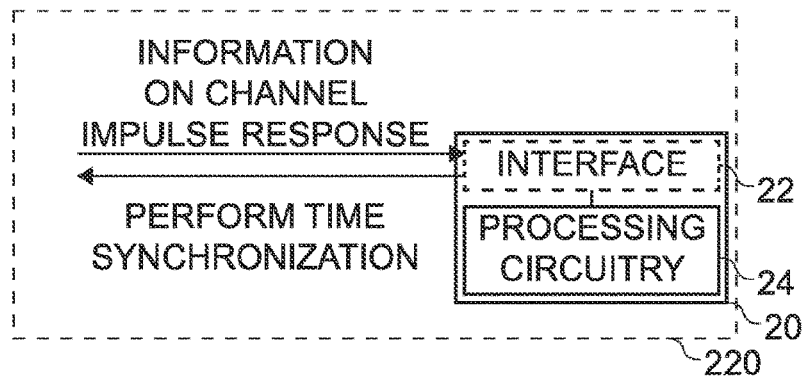
FIG. 2a shows a schematic diagram of an example of a control apparatus or control device for synchronizing a device clock in a device with a reference clock in a master device.
Figure 2B:
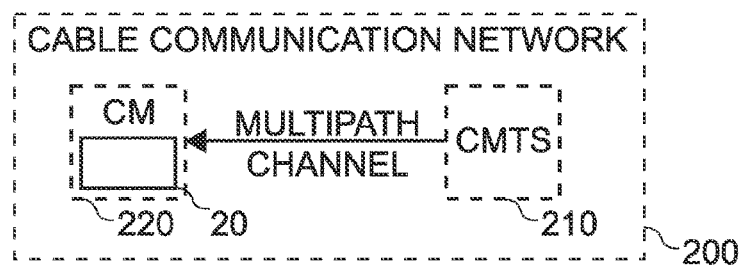
FIG. 2b shows a schematic diagram of a cable communication network comprising a cable modem and a cable modem termination system.

FIG. 2a shows a schematic diagram of an example of a control apparatus 20 or control device 20 for synchronizing a device clock in a device 220 with a reference clock in a master device 210. The device and the master device are connected by a multi-path channel. The control apparatus 20 comprises processing circuitry 24. The components of the control device 20 are defined as component means, which correspond to the respective structural components of the control apparatus 20. Accordingly, the control device 20 comprises corresponding processing means 24. Optionally, the control apparatus/device further comprises interface circuitry/an interface 22, which is coupled to the processing circuitry/processing means. The processing circuitry (and likewise the processing means) is configured to obtain information a channel frequency response of the multi-path channel. The channel frequency response is based on a signal comprising a sequence of symbols. The processing circuitry is configured to transform the channel frequency response into a channel impulse response. The processing circuitry is configured to identify a peak in the channel impulse response. The processing circuitry is configured to determine a timestamp offset time between the peak in the channel impulse response and a trigger time indicative of a beginning of a symbol in the signal. The processing circuitry is configured to synchronize the device clock based on the timestamp offset time.

FIG. 2a further shows the device 220 comprising the control apparatus or device 20. For example, the device 20 may be a cable modem of a cable communication network 200 (as shown in FIG. 2b. Accordingly, FIG. 2a further shows a cable modem 220 comprising the control apparatus or device 20.

FIG. 2b shows a schematic diagram of a cable communication network 200 comprising a cable modem 220 and a cable modem termination system 210. Accordingly, examples of the present disclosure further provide the cable communication system 200 comprising the cable modem 220. The cable communication network may further comprise the master device 210, which may be or comprise a cable modem termination system 210 of the cable communication network 220.

Examples of the present disclosure generally relate to a control apparatus, a control device and control method for synchronizing a device clock in a device 220 with a reference clock in a master device 210, with the device and the master device being connected by a multipath channel. As has been introduced above, examples of the present disclosure may be applied to the synchronization between a device clock of a cable modem and a reference clock in a cable modem termination system (or other counterpart) of a cable communication network, e.g. a DOCSIS-based cable communication network. In some cases, however, examples can also be applied to other combinations of device and master device that are connected over a multi-path channel, e.g. devices that are connected via a shared bus (e.g. in an industrial setting or in a vehicle), or wireless devices (with the device being a user equipment or a remote radio head and the master device being a base station serving the user equipment or remote radio head). Preferably, however, the multi-path channel may be a wirebound multi-path channel.

For example, the multi-path channel may be a wirebound channel between a cable modem and a cable modem termination system of a cable communication network. In general, a multitude of components are used to connect a cable modem to the cable modem termination system. For example, the multi-path channel between the cable modem and the cable modem termination system may comprise one or more cables and one or more taps that are arranged between the cable modem and the cable modem termination system. For example, the multipath channel may comprise a hybrid fiber coaxial cable, e.g. one or more hybrid fiber coaxial cables. Optionally, the multi-path channel between the cable modem and the cable modem may further comprise one or more amplifiers for amplifying the signal on the multi-path channel. The combination of the various components, and the reflections being caused at the interconnects between the different components may make the connection between the cable modem and cable modem termination system a multi-path channel.

The processing circuitry is configured to obtain information a channel frequency response (CFR) of the multi-path channel. For example, the processing circuitry may be configured to obtain a measurement of the channel frequency response, e.g. from another component of the device/cable modem, or by measuring the channel frequency response. Accordingly, the information on the channel frequency response may comprise a representation of the channel frequency response, e.g. a numerical representation of the channel frequency response.

The channel frequency response is based on a signal comprising a sequence of symbols (or series of symbols). In general, the channel frequency response may be determined based on a single symbol of the sequence of symbols, e.g. based on the first symbol of the sequence of symbols. The term "sequence of symbols" may indicate, that the channel frequency response can be gained from within a "normal" signal being exchanged via the multi-path channel. For example, the signal might not necessarily be a calibration signal. On the contrary, the signal may comprise payload information for the device/cable modem (or for other devices/cable modems of the cable communication network). For example, the signal may be transmitted by the master device/cable modem termination system. For example, the signal may be received by the device/cable modem, from the master device/cable modem termination system. Accordingly, the device/cable modem may be configured to receive the signal.

While examples are applicable to different types of symbols, in the following, due to the type of symbols being used in DOCSIS-based cable communication networks, the symbol is assumed to be an Orthogonal Frequency Division Multiplex (OFDM) symbol. Accordingly, the signal may comprise a sequence of OFDM symbols.

The processing circuitry is configured to transform the channel frequency response (CFR) into a channel impulse response (CIR). In general, the channel frequency response can be transformed into a channel impulse response by performing a transformation from frequency domain into time domain, e.g. using an inverse Fourier transform. Accordingly, the processing circuitry may be configured to transform the channel frequency response into the channel impulse response by performing an inverse Fourier transform on the channel frequency response. The inverse Fourier-transformed channel frequency response may correspond to the channel impulse response.

In some examples, however, additional processing may be performed to avoid signal artifacts that are caused by the usage of different frequency bands for transmissions on the multi-path channel. For example, in cable communication network, different portions of the spectrum are being used for different transmissions. For example, some portions of the spectrum are designated as upstream spectrum, some as downstream spectrum, and, in some cases, as full duplex spectrum. Between the spectra, or in some cases within the spectra, frequency bands are excluded from the transmissions, e.g. due to noise being present within the cable communication network. Therefore, the received signal might only cover portions of the available spectrum, with one or more gaps within the spectrum (see in FIG. 7a channel frequency response 715). The processing circuitry may be configured to close these gaps by interpolating over the gaps within the channel frequency response (see e.g. interpolated part 725 of FIG. 7*b*). In other words, the processing circuitry may be configured to interpolate across excluded subcarriers (i.e. subcarriers being excluded from the signal by the entity (e.g. the cable modem termination system) transmitting the signal) in the channel frequency response. In other words, the channel frequency response may comprise one or more gaps due to excluded subcarriers. The processing circuitry may be configured to interpolate across the one or more gaps (if the respective gap is smaller than a threshold), e.g. using linear interpolation. Thus, for at least a subset of the excluded subcarriers, the channel frequency response may be estimated by interpolating across the subset of the excluded subcarriers. This may yield larger contiguous stretches within the channel frequency response.

As has been laid out before, undesired artefacts within the channel impulse response may be created by "missing" portions of the channel frequency response. Therefore, in some examples, the channel impulse response may be determined based on (only) a portion of the channel frequency response. For example, the channel impulse response may be determined for a contiguous (or continuous) part of the channel frequency response, e.g. for the largest contiguous part of the channel frequency response. In this context, a contiguous part of the channel frequency response may be defined as a part of the channel frequency response that does not exhibit a gap (e.g. due to excluded subcarriers). In other words, a contiguous part of the channel frequency response may be a part of the channel frequency response that comprises no discontinuities or interruptions due to excluded subcarriers. The processing circuitry may be configured to identify a contiguous part of the channel frequency response. For example, the processing circuitry may be configured to identify the largest contiguous part of the channel frequency response. In other words, the contiguous part of the channel frequency response may be larger than other contiguous parts (e.g. at least one other contiguous part, or all other contiguous part) of the channel frequency response.

Once the contiguous part of the channel frequency response is identified, its edges may be smoothed. In other words, the processing circuitry may be configured to smooth edges of the contiguous part of the channel frequency response. For example, the processing circuitry may be configured to perform windowing on the contiguous part of the channel frequency response. The window being used for the windowing may comprise a ramp-up section and a ramp-down section at its edges in order to smooth the edges of the contiguous part (see window 735 of FIG. 7*c*).

Furthermore, the other parts of the channel frequency response may be removed from the channel frequency response. This may be done using a process called "zero-padding", wherein all other parts of a signal except a part of interest are set to zero. Accordingly, the processing circuitry may be configured to zero-pad the contiguous part of the channel frequency response (see FIG. 7*d* 745). In other words, the processing circuitry may be configured to set (all) parts outside the contiguous part of the channel frequency response to zero. In some examples, the contiguous part of the channel frequency response may be zero-padded to cover a pre-defined frequency band, e.g. of 204.8 MHz bandwidth.

While the above measures have been introduced as measures that are applied step by step, at least some of these measures may be omitted in some examples. The processing circuitry may be configured to transform the channel frequency response into the channel impulse response by performing an inverse Fourier transform on the contiguous part of the channel frequency response, e.g. on the contiguous part that has been processed using one or more of interpolation of gaps, smoothing of edges and zero padding.

The processing circuitry is configured to identify a peak in the channel impulse response. This process is shown in FIG. 7*e*, for example. For example, the peak may be the largest peak within the channel impulse response. In some examples, the peak may be the largest peak within a pre-defined time-interval either side of the trigger time. In general, the peak in the channel impulse response may be indicative of a direct path within the multi-path channel. The peak may be indicative of the direct path for two reasons—for once, it may be the first major peak (after or before the trigger time, as the direct path is the fastest path), and it may be the largest peak (as the reflections usually have a lower amplitude).

Figure 4:
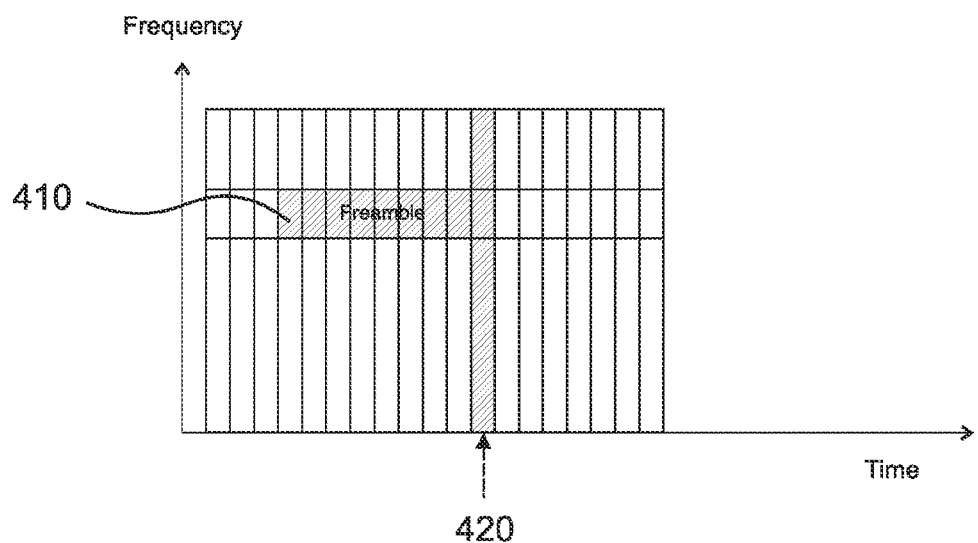
FIG. 4 shows a schematic diagram of a DOCSIS OFDM time stamp.

In various examples, the channel impulse response peak is identified for a (primary) OFDM channel of the cable communication network. Embedded within an OFDM channel is a physical layer control channel (PLC). In general, the PLC channel refers to channel formed by a subset of subcarriers in OFDM symbols. In examples, so-called primary channels may be used for timing synchronization because they are carefully protected by the CMTS (i.e. always available). Examples are shown in relation to OFDM Primary channels, which is going to be the more likely choice for Primary channel going forward as OFDM channels provide improved performance over SC-QAM channels. In OFDM Primary channels, the time stamp is carried in the Physical Layer Control (PLC) channel. For example, the peak may be identified in an OFDM channel impulse response within the PLC. The time stamp may refer to an exact reading of the CMTS reference clock which is sent using the PLC channel. In DOCSIS, the PLC occupies a narrow strip of sub-carriers in the OFDM signal, 8 or 16 subcarriers for 4096 and 8192 OFDM modes respectively. In FIG. 4, the location of the time stamp within the OFDM symbol is shown, with 410 denoting a preamble of the PLC channel and 420 denoting the OFDM symbol corresponding to the time stamp. The time indicated by the time stamp is the precise time of the first sample, after cyclic prefix, of OFDM symbol 420. The dashed arrow 420 points to an OFDM symbol, which is much wider than just the PLC channel in frequency direction (y-axis). Along the x-axis, in FIG. 4, multiple OFDM symbols are shown. Once the receiver demodulates and decodes the PLC channel, it can extract the time stamp data. As mentioned before, this data represents the exact clock reading corresponding to the first sample, after cyclic prefix, of the first OFDM symbol (420) following the preamble (410) of the PLC channel.

The processing circuitry is configured to determine a timestamp offset time between the peak in the channel impulse response and a trigger time indicative of a beginning of a symbol in the signal. As will be shown in more detail in connection with FIG. 6, in cable modems, for OFDM-based symbols, an OFDM symbol timing module (OST) is used to determine the trigger time of the symbol, which is the point in time (or rather which should be the point in time) at which the actual OFDM symbol starts (after the cyclic prefix). In other words, the OST keeps track of the boundaries of the OFDM symbol, with the start of the OFDM symbol being indicated by the trigger time, which is provided to an FFT module that is used to perform a Fourier transform on the OFDM symbol. The processing circuitry may be configured to obtain the trigger time from the OST module (e.g. via interface circuitry 22). At the same time, the channel frequency response, and thus the channel impulse response, may be based on the trigger time, as the channel frequency response may be based on the OFDM symbol that is processed based on the trigger time. Consequently, the time "0" of the channel impulse response may correspond to the trigger time. The timestamp offset time may be determined (i.e. calculated) between the identified peak of the channel impulse response and the "0" time of the channel impulse response (i.e. the trigger time). In other words, the timestamp offset time may be the time between the start of the symbol, as indicated by the trigger time, and the peak that is identified within the channel impulse response.

Figure 6:
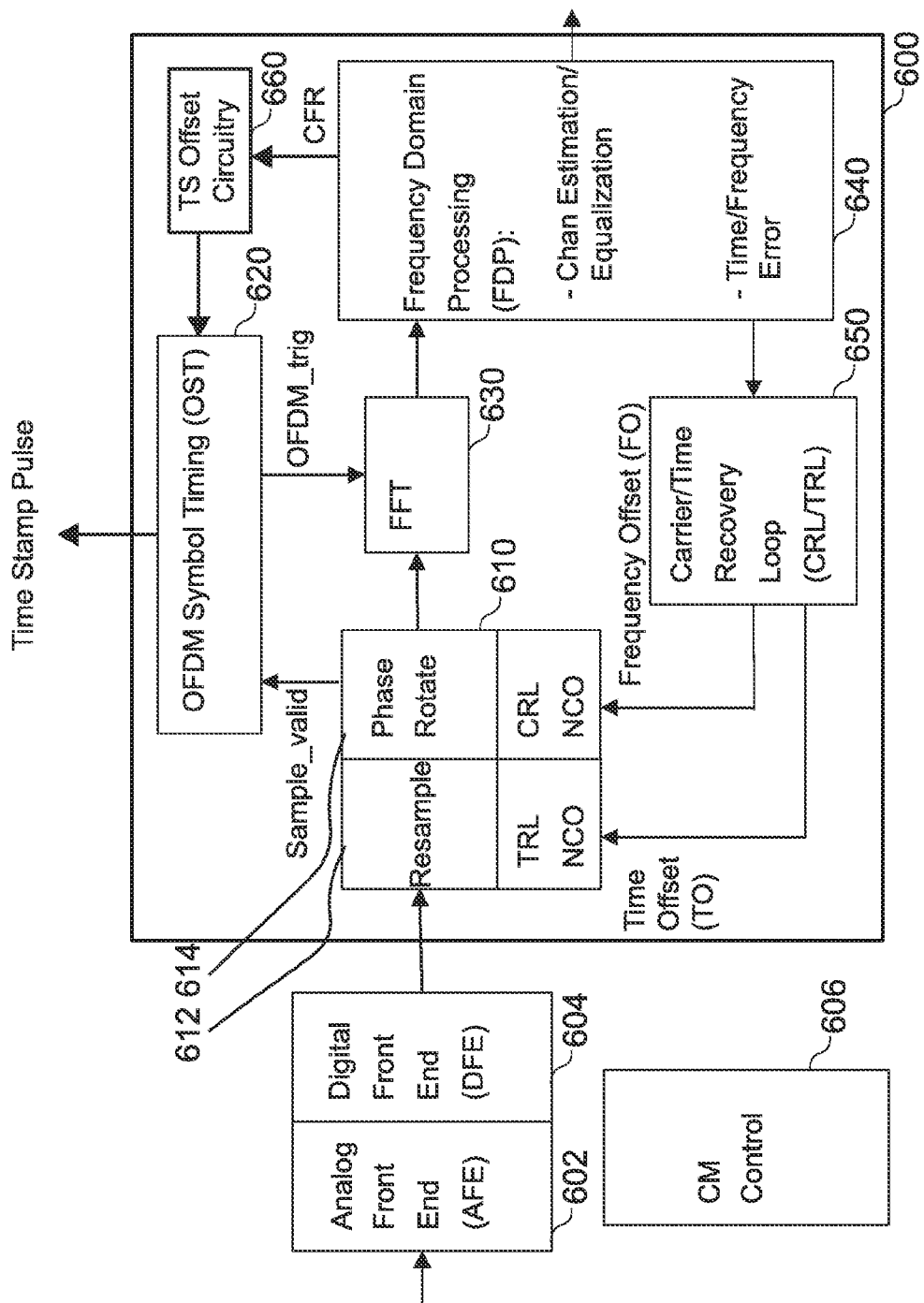
FIG. 6 shows a high-level block diagram of an exemplary cable modem physical layer synchronization architecture.

The processing circuitry is configured to synchronize the device clock based on the timestamp offset time. In general, the device clock may be synchronized by providing information on the timestamp offset time to a component of the device/cable modem that is configured to synchronize the device clock. This component can use the information on the timestamp offset time, together with the trigger time and the time at the reference clock of the master device (which may be included with the symbol) to synchronize the device clock (to the reference clock). Therefore, the processing circuitry may be configured to generate a timestamp pulse at a time corresponding to the trigger time delayed by the timestamp offset time. The timestamp pulse may represent the real time indicated by the timestamp extracted from the PLC channel (demodulated and decoded by CM), and can be used by the above-mentioned component to synchronize the device clock. Accordingly, the processing circuitry may be configured to provide the timestamp pulse to the device clock (e.g. to a component of the device clock being used to synchronize the device clock) for use in synchronization with the reference clock. For example, the OST module (OFDM symbol timing module, e.g. OST 620 of FIG. 6) can generate a pulse to indicate this sample (e.g. the timestamp pulse as shown in FIG. 6), and the clock synchronization module can link the time stamp to the precise time of this pulse. For example, the timestamp offset/timestamp pulse may be used for the DTP time synchronization protocol.

Additionally (or alternatively), the timestamp pulse may be provided to a symbol timing component (e.g. the above-mentioned OFDM symbol timing module) to improve the precision of the symbol timing. In other words, the processing circuitry may be configured to provide the timestamp pulse to a symbol timing component of the device, for use in a determination of the trigger time to use for the sequence of symbols.

In general, the symbol timing component is configured to determine the trigger time/trigger point, which refers to the first sample of an (OFDM) symbol that is processed by the FFT module. In other words, samples that are used to compute the Fourier Transform of an OFDM symbol are collected starting from the sample at the trigger point. For OFDM, the OFDM Symbol Timing (OST) module provides the trigger point to FFT module. In general, the trigger point may be determined such, that it reduces or minimizes the inter symbol interference. This point might not necessarily be the first sample of OFDM symbol with respect to the direct path (which is also the strongest multipath) from CMTS to CM. This is what makes the trigger point not a good pointer to indicate the symbol start, as the trigger point may depend on the entire impulse response (not just the direct path). The OST module keeps track of the OFDM trigger point. With the channel impulse response estimate, and the corresponding timestamp offset, the processing circuitry can determine how far off the trigger point is from the symbol start according to the main signal path (trigger point offset/timestamp offset). Based on the knowledge of the trigger point/trigger time and trigger point offset/timestamp offset, the OST module can generate the time stamp pulse precisely at the first sample of the OFDM symbol. In FIG. 6, the signal "OFDM Trig" indicates to the FFT module when to start collecting samples for an OFDM symbol.

The interface/interface circuitry 22 may correspond to one or more inputs and/or outputs for receiving and/or transmitting information, which may be in digital (bit) values according to a specified code, within a module, between modules or between modules of different entities. For example, the interface/interface circuitry 22 may comprise interface circuitry configured to receive and/or transmit information. In example, the processing circuitry/processing means 24 may be implemented using one or more processing units, one or more processing devices, any means for processing, such as a processor, a computer or a programmable hardware component being operable with accordingly adapted software. In other words, the described function of the processing circuitry/processing means 24 may as well be implemented in software, which is then executed on one or more programmable hardware components. Such hardware components may comprise a general-purpose processor, a Digital Signal Processor (DSP), a micro-controller, etc.

More details and aspects of the control apparatus/control device 20, the device/cable modem 220 and/or the cable communication network 200 are mentioned in connection with the proposed concept or one or more examples described above or below (e.g. FIGS. 1, 3 to 8*c*). The control apparatus/control device 20, the device/cable modem 220 and/or the cable communication network 200 may comprise one or more additional optional features corresponding to one or more aspects of the proposed concept or one or more examples described above or below.

Figure 3:
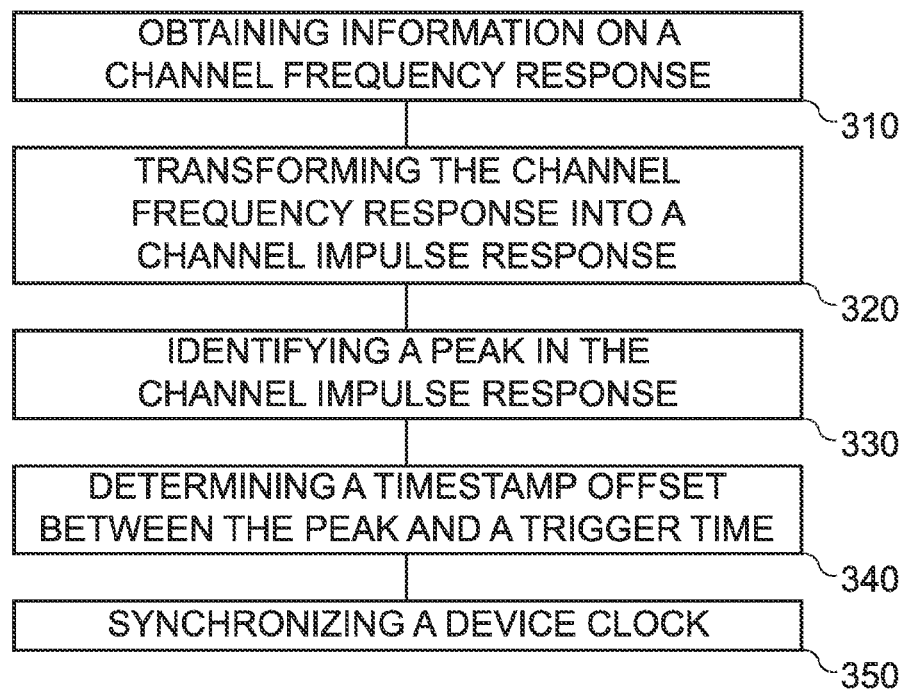
FIG. 3 shows a flow chart of a control method for synchronizing a device clock in a device with a reference clock in a master device.

FIG. 3 shows a flow chart of a corresponding control method for synchronizing a device clock in a device with a reference clock in a master device. The device and the master device are connected by a multi-path channel. The control method comprises obtaining 310 information a channel frequency response of the multi-path channel. The channel frequency response is based on a signal comprising a sequence of symbols. The control method comprises transforming 320 the channel frequency response into a channel impulse response. The control method comprises identifying 330 a peak in the channel impulse response. The control method comprises determining 340 a timestamp offset time between the peak in the channel impulse response and a trigger time indicative of a beginning of a symbol in the signal. The control method comprises synchronizing 350 the device clock based on the timestamp offset time. Features described in connection with the control apparatus/device of FIG. 2*a* and/or 2*b* may likewise be applied to the control method of FIG. 3

More details and aspects of the control method are mentioned in connection with the proposed concept or one or more examples described above or below (e.g. FIG. 1*a* to 2*b*, 4 to 8*c*). The control method may comprise one or more additional optional features corresponding to one or more aspects of the proposed concept or one or more examples described above or below.

In the following description, a plurality of details is set forth to provide a more thorough explanation of the examples of the present disclosure. However, it will be apparent to one skilled in the art that examples of the present disclosure may be practiced without these specific details. In other instances, well-known structures and devices are shown in block diagram form rather than in detail in order to avoid obscuring examples of the present disclosure. In addition, features of the different examples described hereinafter may be combined with each other, unless specifically noted otherwise.

5G papers predict that a significant amount of 5G base stations will be deployed in dense urban environments where laying fiber infrastructure is very costly and will likely happen very slowly due to funding constraints. One of the solutions the market may adopt is backhauling 5G traffic over coax cables (which are available practically everywhere) over the existing DOCSIS protocol. To meet 5G requirements, a common clock may be delivered to all the cells with very high accuracy over the network. Having the clock delivered with high accuracy over existing infrastructure will likely accelerate and broaden the deployment of 5G.

The described systems, methods, and circuitries may enable the implementation of DTP using CM products to exceed the clock synchronization accuracy required to use DOCSIS as a 5G Backhaul (MBDOCSIS) technology. This gives Multiple System Operators (MSOs) and Mobile Network Operators (MNOs) the opportunity to relax requirements on rest of the network or even get MBDOCSIS to work in network architectures otherwise not feasible—e.g. more intermediate switch points (each switch point introduces additional clock error).

For the OFDM primary channel, the timestamp is carried in the Physical Layer Control (PLC) channel. The CMTS defines this timestamp with reference to the first OFDM symbol following the preamble of PLC channel as shown in FIG. 4. FIG. 4 shows a schematic diagram of a DOCSIS OFDM time stamp, as used in the DOCSIS 3.1 Physical Layer Specification. In FIG. 4, a sequence of OFDM symbols is shown, the sequence comprising the preamble 410 of the PLC channel and the timestamp 420.

Figure 5A:
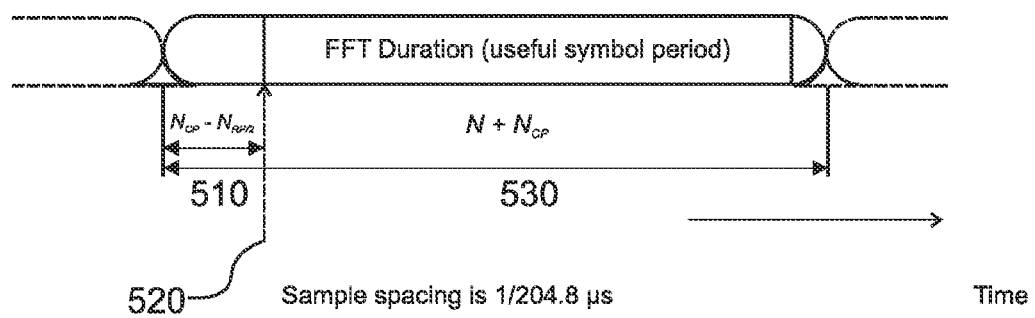
FIGS. 5a and 5b show a sample corresponding to the time stamp in context.
Figure 5B:
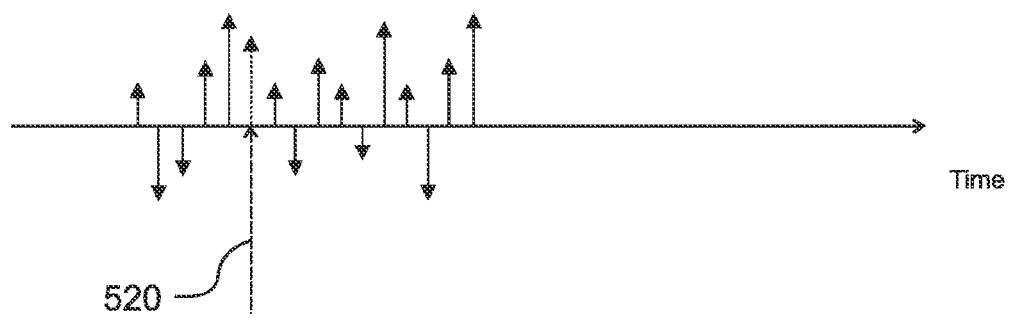

In the DOCSIS specification, the PLC occupies a narrow strip of sub-carriers in the OFDM signal, 8 or 16 sub-carriers for 4096 and 8192 OFDM modes respectively. The precise sample of the timestamp is the first sample of the OFDM FFT at CMTS side as shown in FIGS. 5a and 5b. In FIGS. 5a and 5b, the sample corresponding to the time stamp is shown in context. In FIG. 5a, the duration of the symbol is shown, with a first portion 510 of length $N_{CP}-N_{RP/2}$ (length of the cyclic prefix $N_{CP}$ and length of the roll-off period $N_{RP}$) and a second overlapping portion 530 of length $N+N_{CP}$ (i.e. the FFT duration (useful symbol period) N plus the length of the cyclic prefix $N_{CP}$). The sample 520 (i.e. $N_{CP}-N_{RP/2}+1$st sample of the second portion 530) is the sample that corresponds to the timestamp. In FIG. 5b, the same is shown in a different representation. In DOCSIS, the sample spacing is $$\frac{1}{204.8}\mu s.$$

Here N, $N_{CP}$, $N_{RP}$ are the FFT size (i.e. number of samples in useful symbol period), cyclic prefix size, and roll off period respectively.

The sample indicated by the dashed arrow 520 is the time that corresponds to the timestamp carried in the PLC for this particular OFDM frame, the OFDM frame being the 128 OFDM symbols headed by the PLC preamble shown in FIG. 4.

The CM demodulates and decodes the PLC of the primary channel and extracts the timestamp information, which is a 64-bit value indicating the time at the CMTS for the sample indicated by the dashed arrow 520 in FIGS. 5a and 5b.

The described systems, methods, and circuitries determine this sample point more accurately in the received signal, which has been subjected to a multi-path channel between the CMTS and the CM, at the CM. Therefore any timing error contribution due to timestamp detection in the clock synchronization process at the CM may be reduced or minimized.

A high-level block diagram of an exemplary CM Physical Layer synchronization architecture is given in FIG. 6.

An analogue front end (AFE) 602 includes analogue and mixed signal processing modules needed for sampling the received RF signal to create the digital signal. In DOCSIS 3.1 and FDX, a full bandwidth capture is used, meaning that the downstream spectrum is digitized using the single Analogue to Digital Converter (ADC). A digital front end (DFE) 604 is responsible for processing the full bandwidth digital samples of the downstream signal into individual OFDM and SC-QAM DOCSIS channels. The following description will focus on the OFDM primary channel.

A resample/Phase Rotate module 610 (comprising resample circuitry 612 and phase rotate circuitry 614) is responsible for correcting the sample rate offset and the frequency offset on the input OFDM signal. The timing phases used for resampling are derived by an NCO (Numerically Controlled Oscillator) driven with a Sample Time Offset (TO) estimate. The phase for the complex phasor used to correct the frequency offset is derived by an NCO driven with a Frequency Offset (FO) estimate.

A Carrier Frequency and Timing Recovery module 650 keeps track of the frequency and time offset of the OFDM channel. This includes a Carrier Recovery Loop filter (CRL) and a Timing Recovery Loop filter (TRL). These loop filters may have proportional and integral branches to work out Frequency and Timing offset based on the frequency and timing error coming from a Frequency Domain Processing (FDP) module 640. The TRL NCO uses the time offset to drive an NCO which keeps track of sampling phase for output samples and to determine when output samples are to be generated by the Resample module (by generating a sample_valid signal to indicate that a valid sample is being output from the Resample/Phase Rotate module). The Resample module generates timing offset corrected samples and outputs them with an accompanying sample_valid signal. The CRL NCO takes the frequency offset estimate and drives an NCO to work out a multiplicative phasor to correct the frequency offset from the Resample output Sample rate and frequency offset corrected samples are send to an FFT module 630 with the accompanying sample_valid signal.

System hardware may be designed such that the signal delay from AFE input to the Resample/Phase Rotate output is a fixed known value (with minimum jitter). The OFDM trigger point (start point of gathering samples for FFT) is applied to samples coming out of Phase Rotate module.

An OFDM Symbol Timing (OST) module 620 keeps track of OFDM symbol boundaries. This is done by, first working out OFDM symbol boundaries using standard techniques, such as cyclic prefix correlation. Also there could be finer trigger adjustments to the OFDM Symbol Timing, which may come from hardware or/and software-based processing of Channel Impulse Response (CIR). Once the trigger point is determined, keeping track of symbol boundaries is done by counting of signal samples in the OST using the sample_valid pulses coming from the Resample module, which are at correct sample times after sample rate correction at the Resampler. The trigger point is advanced from symbol to symbol by counting the correct number of samples, $N+N_{CP}$, in the OFDM symbol.

The FFT module 630 calculates the DFT for a time domain OFDM signal to take the signal to the frequency domain. In the frequency domain, the OFDM sub-carriers can be processed by the frequency domain processing (FDP) module 640. The FDP module processes the frequency domain OFDM symbols to work out the time and frequency error (residual after current correction in Resample/Phase Rotate module). Generally this is done using phase information carried in continuous pilots in OFDM signal. The time and frequency error coming from the FDP module is passed on to the CRL/TRL loop filters to update the Time and Frequency Offset estimates. The FDP Module also works out the Channel Frequency Response (CFR), which is primarily used for channel equalization.

The CFR from FDP is input to a timestamp (TS) offset circuitry 660 (which may be implemented by the control apparatus or device 20 of FIGS. 2a and/or 2b) that determines an offset time between the trigger time and the timestamp sample (i.e. the peak in the CIR). The TS offset circuitry may perform an IDFT (implemented as an IFFT) on the CFR to get the Channel Impulse Response (CIR). The IDFT size may be selected to achieve desired a timing resolution for the CIR. DOCSIS 3.1 OFDM Primary channel bandwidth can be anything between 22 MHz to 190 MHz. OFDM sub-carrier spacing is 25 kHz for 8192 OFDM and 50 kHz for 4096 OFDM mode. DOCSIS 3.1 specification guarantees at least 22 MHz of contiguous OFDM spectrum for an OFDM downstream channel. There could be blocks of subcarriers or individual sub-carriers excluded outside this guaranteed contiguous spectrum. Small (few subcarriers) gaps in the CFR can be interpolated by the TS offset circuitry to increase the width of contiguous CFR available for IDFT. DOCSIS OFDM sample period is 1/204.8 MHz=4.88 ns and to get the same resolution in CIR, the TS offset circuitry may zero pad the contiguous part of CFR spectrum to cover 204.8 MHz bandwidth. Hence 4096 or 8192 sub-carriers for 4K and 8K OFDM modes are used, respectively. The TS offset circuitry can decimate the zero-padded CFR for 8K mode by factor of 2 to get the same IDFT size as 4K mode. The CIR calculation process that can be performed by the TS offset circuitry is summarized in FIGS. 7a to 7e. Alternatively, the timestamp offset calculation can be done using software, and the timestamp offset can be programmed into the OST module.

Figure 7A:
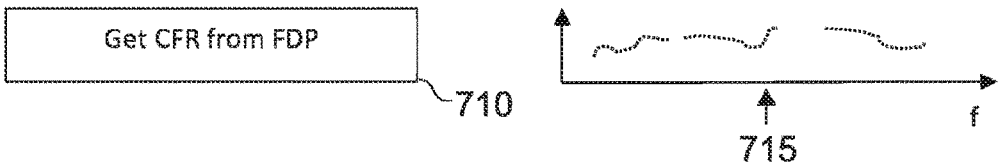
FIGS. 7a to 7e illustrate signal processing being applied on the channel frequency response.
Figure 7B:
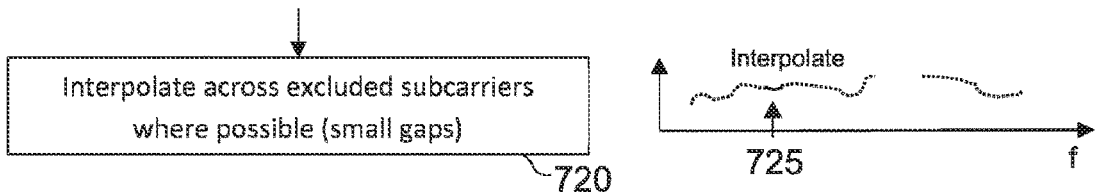
Figure 7C:
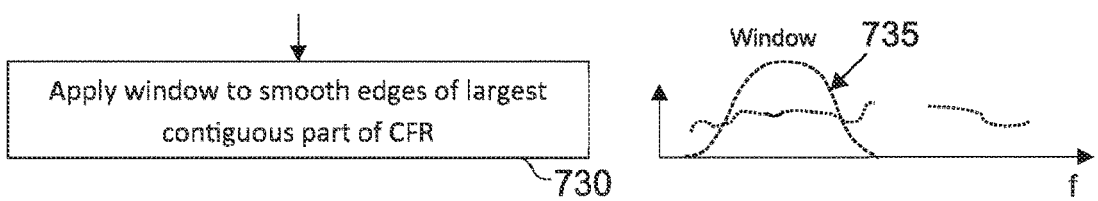
Figure 7D:
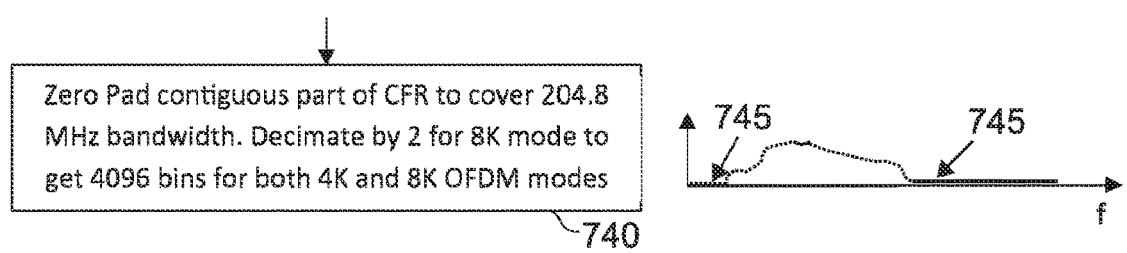
Figure 7E:
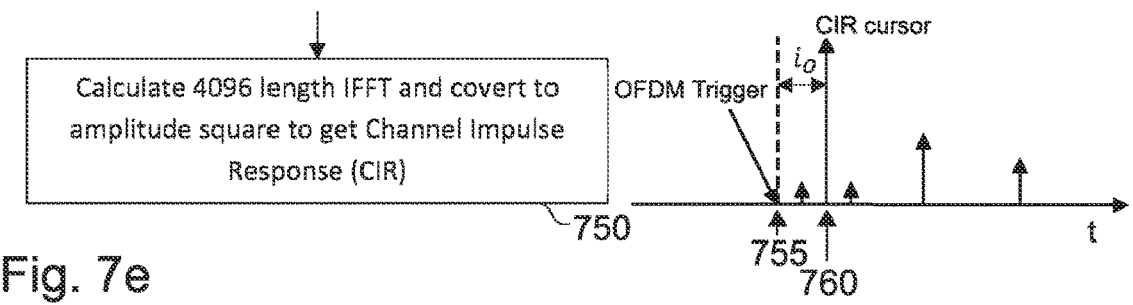

FIGS. 7a to 7e show signal processing being applied on the channel frequency response in order to obtain the channel impulse response. In FIG. 7a, the timestamp offset circuitry (i.e. the control apparatus/device 20) obtains 710 the CFR from the FDP. On the right side of FIG. 7a, an exemplary channel frequency response 715 is shown. In FIG. 7b, interpolation 720 is applied over excluded subcarriers where possible (for small gaps). On the right side, an interpolated portion 725 is shown. In FIG. 7c, a window 735 is applied 730 to smooth the edges of the largest continuous part of the CFR. In FIG. 7d, zero padding 745 is applied 740 on the contiguous part of the CFR to cover a 204.8 MHz bandwidth. Decimation by 2 may be applied for 8K mode to get 4096 bins for both 4K and 8K modes. In FIG. 7e, a 4096 length IFFT is calculated and converted to amplitude square to obtain the channel impulse response (right side). In the channel impulse response, the OFDM trigger 755 and the CIR cursor 760 (at the peak) is shown, with the time offset between the OFDM trigger and the CIR cursor being denoted $i_o$.

The CIR estimate above can be used to calculate the optimal OFDM trigger point to minimize inter symbol interference (ISI). It is assumed that the trigger point is calculated and passed on to the OST module to keep track of symbol timing.

Figure 7F:
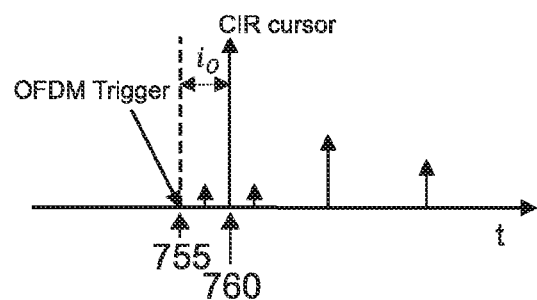
FIG. 7f shows the channel impulse response in isolation.

The TS offset circuitry uses the CIR estimate to estimate the time offset $i_o$ from the trigger point to the timestamp sample as shown in FIG. 7f. FIG. 7f shows the channel impulse response in isolation. FIG. 7f illustrates the time offset from the OFDM trigger point to the time stamp sample.

Once all other sources of timing shift, such as any phase slopes applied in frequency domain, are compensated, time 0 (index 0 of IFFT) in the CIR corresponds to the trigger point. To keep things general, it is assumed that the trigger point corresponds to index $i_{Trig}$. The peak of the impulse response gives the location of the channel cursor or the location of the first IFFT sample of the main path of OFDM signal. According to the DOCSIS 3.1 specification, this is the sample to which the timestamp should be linked. The CIR peak location (index), $i_{Max}$, is the index for maximum amplitude of CIR.

Hence the time offset, given in 4.88 ns samples, between trigger point and timestamp sample, $i_{MAX}$, is given by, $$i_O = i_{Max} - i_{Trig}$$

Once the TS offset $i_O$ is estimated by the TS offset circuitry, the OST module can be provided with this information. The OST can combine knowledge of the trigger point and the TS offset $i_O$ to generate a TS pulse to indicate the correct time for timestamp.

For this algorithm, the accuracy of the timestamp assignment depends on how accurately the TS offset circuitry determines the location of the channel cursor. The simulations illustrated in FIGS. 8a to 8c were performed to show that the accuracy of detecting the timestamp based on the above described technique is within one sample (4.8 ns). Even for extreme cases simulated, the estimate is within two samples (8 ns). Given that there are several other contributors to timing error in the CM, such as AFE jitters, MAC jitters, Ethernet jitters, etc., it is critical that time stamp jitter is kept to a minimum. A target is to meet 40 ns clock synchronization accuracy for CM (this is well within the 100 ns minimum accuracy given in MBDOCSIS Spec) and with the level of accuracy we achieved with the described systems, methods, and circuitries, the overall clock error is kept within this limit.

In simulations, OFDM parameters as specified in the DOCSIS 3.1 specification were used. An oversampling rate of 4 was used to create channel input at 204.8·4 MHz. This may enable modelling multi-path with a time resolution of 1.2 ns. This is sufficient to assess channel cursor detection accuracy down to order of few ns. An OFDM Primary channel with minimum DOCSIS 3.1 bandwidth of 22 MHz was used as this gives the worst case in terms of timing resolution (timing resolution inversely proportional to signal bandwidth). Results for maximum OFDM bandwidth of 190 MHz is also given for comparison.

A DOCSIS 3.1 HFC channel model with worst case multi-path and SNR settings was used. As defined in DOCSIS 3.1, the following values were used: Micro-reflections bound for dominant single echoes were modeled as −20 dBc for echoes ≤0.5 μs, −25 dBc for echoes ≤1.0 μs, −30 dBc for echoes ≤1.5 μs, −35 dBc for echoes >2.0 μs, −40 dBc for echoes >3.0 μs, −45 dBc for echoes >4.5 μs, and −50 dBc for echoes >5.0 μs. Presence of (strong) multi-paths makes the detection of the main peak (cursor) of the CIR more difficult. The worst-case SNR (Signal to Noise Ratio) values in DOCSIS 3.1 may be assumed to be ~14 dB.

The CFR estimate was implemented as a linear average of a pilot-based channel estimate. The modeled CM uses programmable Auto Regressive (AR) averaging coefficients. Average length of 8 or 16 can be considered to be at a minimum, giving 9- or 12-dB processing gain in SNR for CFR leading to 23-26 dB SNR for CFR.

The detection of channel cursor is likely to be made difficult by close in −20 dB multi-path (worst case amplitude from the DOCSIS 3.3 specification). Other multi-path effects which are at least 25 dB below the channel cursor are at least 1 μs away and therefore unlikely to have significant impact on detection of channel cursor. However, the multi-path channel was implemented with 8 reflections, including the main path. The location of the second multipath was modeled from 0 to 50 ns in steps of the oversample rate (i.e. 204.8 MHz*4). This yields 41 possibilities. For each possibility, the main path was placed between two 204.8 MHz samples in resolution of oversample rate, which yields 4 choices. Hence overall, there are 164 test cases. Each test case was run with random noise, and random phases for multi-paths for 16 different instances. This may be a better approach, compared to a blind Monte Carlo approach with random impulse response, to test the accuracy of channel cursor detection algorithm, as it systematically exercises all relevant impulse locations that matter.

Location of the channel cursor is estimated using the peak location of channel impulse response. This is in line with the trigger point estimation method used in some cable modems. Given that the peak of the channel impulse response corresponds to the main signal path from the HFC node to CM, this may yield the achievable accuracy in assigning time stamp to a point in time in the downstream time domain OFDM signal.

Figure 8A:
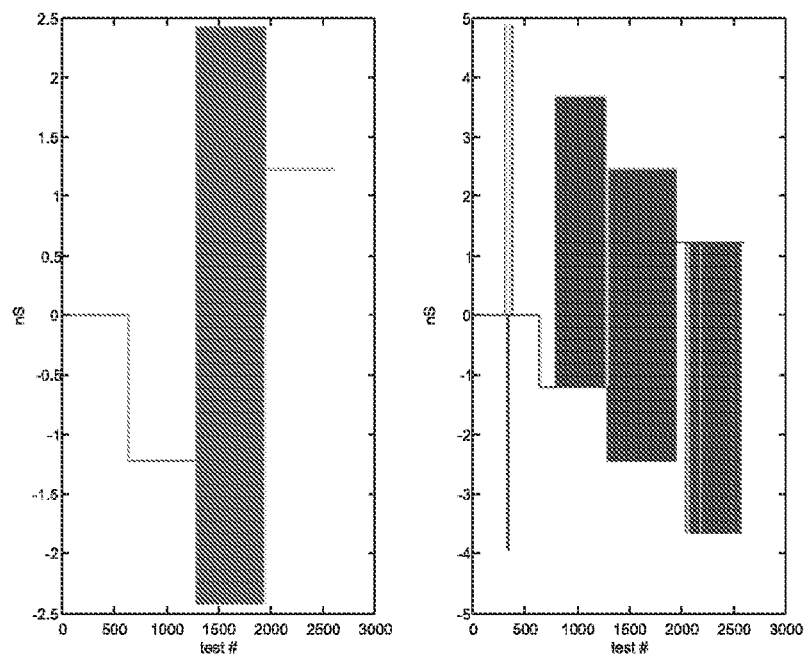
FIGS. 8a to 8c show graphs of a channel impulses response cursor detection error for various simulation setups.

In a first test, a signal SNR of 10 dB was used (4 dB lower than the minimum SNR expected for DOCSIS 3.1) with no time averaging. Thus, a 16 dB SNR for pilots with 6 dB pilot boosting in DOCSIS 3.1 was obtained. The channel frequency response has a SNR of 16 dB. FIG. 8a shows the CIR cursor detection error for 22 MHz and 190 MHz signals for different test cases. FIG. 8a shows a graph of a channel impulses response cursor detection error. On the right, the cursor detection error is shown for narrowband signals, and on the left for wideband signals. In simulations, the CIR cursor detection absolute error was less than 2.5 ns for Wideband OFDM, and less than 5 ns for Narrowband OFDM.

Figure 8B:
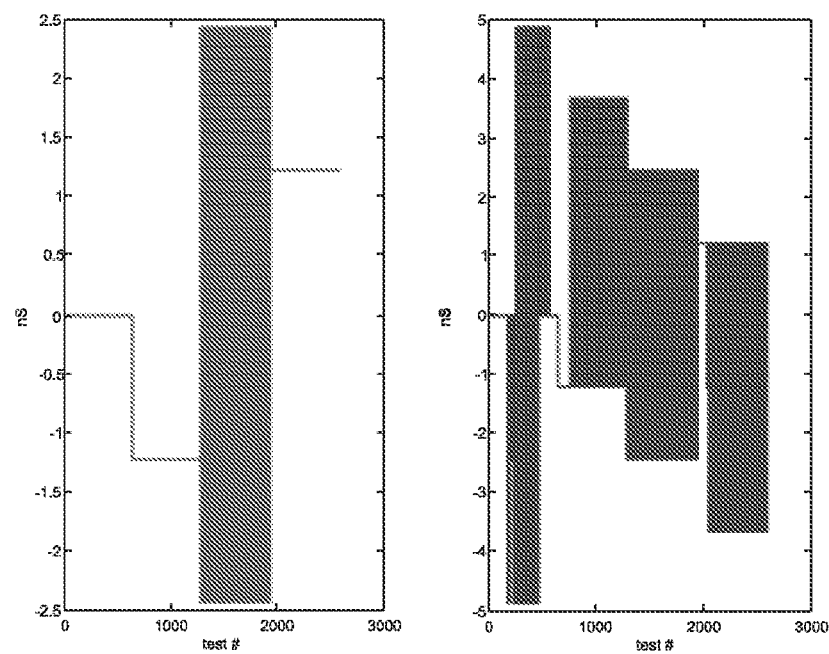

In a second test, a signal SNR of 10 dB with a time averaging length of 8 was used. In consequence, 16 dB SNR for pilots with 6 dB pilot boosting was obtained. The channel frequency response estimate had an SNR of 16+9=25 dB. The amplitude of the second echo was increased to −16 dB from the spec value of −20 dB. FIG. 8b shows the CIR cursor detection error for 22 MHz and 190 MHz signals for different test cases. The CIR cursor detection absolute error was less than 2.5 ns for Wideband OFDM, and less than 5 ns for Narrowband OFDM.

Figure 8C:
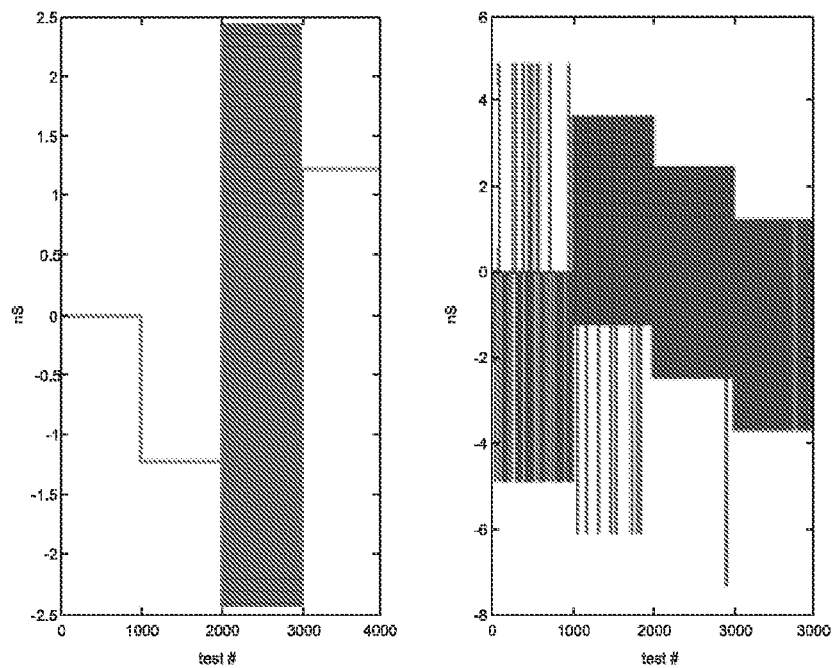

In a third test, a signal SNR of 10 dB with a time averaging length of 8 was used (16 dB SNR for pilots with 6 dB pilot boosting). The channel frequency response estimate has a SNR of 16+9=25 dB. Instead of a second multi-path, 5 multi-paths of −20 dB were randomly placed between 0 and 15 ns. This is an edge case as far as the HFC channel is concerned. For each possible 4 locations of the main path, 1000 tests were simulated. FIG. 8c shows the CIR cursor detection error for 22 MHz and 190 MHz signals for different test cases. In FIG. 8c, the CIR cursor detection absolute error is less than 2.5 ns for Wideband OFDM and less than 8 ns for Narrowband OFDM. In conclusion, the error for the wideband channel was shown to be within 0.5 samples and within 2 samples for narrowband channels, in 204.8 MHz sample rate. This is within what is required to achieve a 40 ns clock accuracy target for MBDOCSIS for 5G.

It can be seen from the foregoing description that the accuracy of timestamp determination is improved by precisely calculating the sample point in the time domain signal that corresponds to the time stamp. The described systems, methods, and circuitries leverage the fact that the DOCSIS propagation channel has one dominant direct path calculate the correct sample time for timestamp based on this main path. This eliminates the dependency of timestamp assignment on the impulse response of multi-path channel. The only source of error introduced is the uncertainty in determining the location of main path. It has been shown that, for practical HFC multi-path channels at realistic signal to noise ratio (SNR), the detection of the time stamp time is well accurate within what is required to support MBDOCSIS While examples of the present disclosure have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations.

Examples can include subject matter such as a method, means for performing acts or blocks of the method, at least one machine-readable medium including instructions that, when performed by a machine cause the machine to perform acts of the method or of an apparatus or system for practicing the examples and examples described herein.

Example 1 relates to a control apparatus (20) for synchronizing a device clock in a device (220) with a reference clock in a master device (210), wherein the device and the master device are connected by a multi-path channel, the control apparatus (20) comprising processing circuitry (24) being configured to obtain information a channel frequency response of the multi-path channel, the channel frequency response being based on a signal comprising a sequence of symbols. The processing circuitry (24) is configured to transform the channel frequency response into a channel impulse response. The processing circuitry (24) is configured to identify a peak in the channel impulse response. The processing circuitry (24) is configured to determine a timestamp offset time between the peak in the channel impulse response and a trigger time indicative of a beginning of a symbol in the signal. The processing circuitry (24) is configured to synchronize the device clock based on the timestamp offset time.

In Example 2, the subject matter of example 1 or any of the Examples described herein may further include, that the peak in the channel impulse response is indicative of a direct path within the multi-path channel.

In Example 3, the subject matter of one of the examples 1 to 2 or any of the Examples described herein may further include, that the processing circuitry is configured to interpolate across excluded subcarriers in the channel frequency response.

In Example 4, the subject matter of one of the examples 1 to 3 or any of the Examples described herein may further include, that the processing circuitry is configured to identify a contiguous part of the channel frequency response.

In Example 5, the subject matter of example 4 or any of the Examples described herein may further include, that the processing circuitry is configured to smooth edges of the contiguous part of the channel frequency response.

In Example 6, the subject matter of one of the examples 4 to 5 or any of the Examples described herein may further include, that the processing circuitry is configured to zero-pad the contiguous part of the channel frequency response.

In Example 7, the subject matter of one of the examples 4 to 6 or any of the Examples described herein may further include, that the contiguous part of the channel frequency response is larger than other contiguous parts of the channel frequency response.

In Example 8, the subject matter of one of the examples 4 to 7 or any of the Examples described herein may further include, that the processing circuitry is configured to transform the channel frequency response into the channel impulse response by performing an inverse Fourier transform on the contiguous part of the channel frequency response.

In Example 9, the subject matter of one of the examples 1 to 8 or any of the Examples described herein may further include, that the processing circuitry is configured to generate a timestamp pulse at a time corresponding to the trigger time delayed by the timestamp offset time.

In Example 10, the subject matter of example 9 or any of the Examples described herein may further include, that the processing circuitry is configured to provide the timestamp pulse to the device clock for use in synchronization with the reference clock.

In Example 11, the subject matter of one of the examples 9 to 10 or any of the Examples described herein may further include, that the processing circuitry is configured to provide the timestamp pulse to a symbol timing component of the device, for use in a determination of the trigger time to use for the sequence of symbols.

In Example 12, the subject matter of one of the examples 1 to 11 or any of the Examples described herein may further include, that the symbol is an Orthogonal Frequency Division Multiplex, OFDM, symbol, and/or that the signal comprises a sequence of OFDM symbols.

In Example 13, the subject matter of one of the examples 1 to 12 or any of the Examples described herein may further include, that the device is a cable modem of a cable communication network (200).

In Example 14, the subject matter of example 13 or any of the Examples described herein may further include, that the impulse response peak is identified for an OFDM channel of the cable communication network.

In Example 15, the subject matter of one of the examples 1 to 14 or any of the Examples described herein may further include, that the master device comprises a cable modem termination system.

In Example 16, the subject matter of one of the examples 1 to 15 or any of the Examples described herein may further include, that the multi-path channel comprises a hybrid fiber coaxial cable.

Example 17 relates to a cable modem (220) comprising the control apparatus (20) according to one of the examples 1 to 16, the cable modem being the device.

Example 18 relates to a cable communication system (200) comprising the cable modem (220) according to example 17.

In Example 19, the subject matter of example 18 or any of the Examples described herein may further include the master device (210).

In Example 20, the subject matter of example 19 or any of the Examples described herein may further include, that the master device comprises a cable modem termination system of the cable communication network.

Example 21 relates to a control device (20) for synchronizing a device clock in a device (220) with a reference clock in a master device (210), wherein the device and the master device are connected by a multi-path channel, the control device (20) comprising processing means (24) being configured to obtain information a channel frequency response of the multi-path channel, the channel frequency response being based on a signal comprising a sequence of symbols. The processing means is configured to transform the channel frequency response into a channel impulse response. The processing means is configured to identify a peak in the channel impulse response. The processing means is configured to determine a timestamp offset time between the peak in the channel impulse response and a trigger time indicative of a beginning of a symbol in the signal. The processing means is configured to synchronize the device clock based on the timestamp offset time.

In Example 22, the subject matter of example 21 or any of the Examples described herein may further include, that the peak in the channel impulse response is indicative of a direct path within the multi-path channel.

In Example 23, the subject matter of one of the examples 21 to 22 or any of the Examples described herein may further include, that the processing means is configured to interpolate across excluded subcarriers in the channel frequency response.

In Example 24, the subject matter of one of the examples 21 to 23 or any of the Examples described herein may further include, that the processing means is configured to identify a contiguous part of the channel frequency response.

In Example 25, the subject matter of example 24 or any of the Examples described herein may further include, that the processing means is configured to smooth edges of the contiguous part of the channel frequency response.

In Example 26, the subject matter of one of the examples 24 to 25 or any of the Examples described herein may further include, that the processing means is configured to zero-pad the contiguous part of the channel frequency response.

In Example 27, the subject matter of one of the examples 24 to 26 or any of the Examples described herein may further include, that the contiguous part of the channel frequency response is larger than other contiguous parts of the channel frequency response.

In Example 28, the subject matter of one of the examples 24 to 27 or any of the Examples described herein may further include, that the processing means is configured to transform the channel frequency response into the channel impulse response by performing an inverse Fourier transform on the contiguous part of the channel frequency response.

In Example 29, the subject matter of one of the examples 21 to 28 or any of the Examples described herein may further include, that the processing means is configured to generate a timestamp pulse at a time corresponding to the trigger time delayed by the timestamp offset time.

In Example 30, the subject matter of example 29 or any of the Examples described herein may further include, that the processing means is configured to provide the timestamp pulse to the device clock for use in synchronization with the reference clock.

In Example 31, the subject matter of one of the examples 29 to 30 or any of the Examples described herein may further include, that the processing means is configured to provide the timestamp pulse to a symbol timing component of the device, for use in a determination of the trigger time to use for the sequence of symbols.

In Example 32, the subject matter of one of the examples 21 to 31 or any of the Examples described herein may further include, that the symbol is an Orthogonal Frequency Division Multiplex, OFDM, symbol, and/or wherein the signal comprises a sequence of OFDM symbols.

In Example 33, the subject matter of one of the examples 21 to 32 or any of the Examples described herein may further include, that the device is a cable modem of a cable communication network (200).

In Example 34, the subject matter of example 33 or any of the Examples described herein may further include, that the impulse response peak is identified for an OFDM channel of the cable communication network.

In Example 35, the subject matter of one of the examples 21 to 34 or any of the Examples described herein may further include, that the master device comprises a cable modem termination system.

In Example 36, the subject matter of one of the examples 21 to 35 or any of the Examples described herein may further include, that the multi-path channel comprises a hybrid fiber coaxial cable.

Example 37 relates to a cable modem (220) comprising the control device (20) according to one of the examples 21 to 36, the cable modem being the device.

Example 38 relates to a cable communication system (200) comprising the cable modem (220) according to example 37.

In Example 39, the subject matter of example 38 or any of the Examples described herein may further include the master device (210).

In Example 40, the subject matter of example 39 or any of the Examples described herein may further include, that the master device comprises a cable modem termination system of the cable communication network.

Example 41 relates to a control method for synchronizing a device clock in a device (220) with a reference clock in a master device (210), wherein the device and the master device are connected by a multi-path channel, the control method comprising obtaining (310) information a channel frequency response of the multi-path channel, the channel frequency response being based on a signal comprising a sequence of symbols. The control method comprises transforming (320) the channel frequency response into a channel impulse response. The control method comprises identifying (330) a peak in the channel impulse response. The control method comprises determining (340) a timestamp offset time between the peak in the channel impulse response and a trigger time indicative of a beginning of a symbol in the signal. The control method comprises synchronizing (350) the device clock based on the timestamp offset time.

In Example 42, the subject matter of example 41 or any of the Examples described herein may further include, that the peak in the channel impulse response is indicative of a direct path within the multi-path channel.

In Example 43, the subject matter of one of the examples 41 to 42 or any of the Examples described herein may further include, that the control method comprises interpolating across excluded subcarriers in the channel frequency response.

In Example 44, the subject matter of one of the examples 41 to 43 or any of the Examples described herein may further include, that the control method comprises identifying a contiguous part of the channel frequency response.

In Example 45, the subject matter of example 44 or any of the Examples described herein may further include, that the control method comprises smoothing edges of the contiguous part of the channel frequency response.

In Example 46, the subject matter of one of the examples 44 to 45 or any of the Examples described herein may further include, that the control method comprises zero-padding the contiguous part of the channel frequency response.

In Example 47, the subject matter of one of the examples 44 to 46 or any of the Examples described herein may further include, that the contiguous part of the channel frequency response is larger than other contiguous parts of the channel frequency response.

In Example 48, the subject matter of one of the examples 44 to 47 or any of the Examples described herein may further include, that the control method comprises transforming the channel frequency response into the channel impulse response by performing an inverse Fourier transform on the contiguous part of the channel frequency response.

In Example 49, the subject matter of one of the examples 41 to 48 or any of the Examples described herein may further include, that the control method comprises generating a timestamp pulse at a time corresponding to the trigger time delayed by the timestamp offset time.

In Example 50, the subject matter of example 49 or any of the Examples described herein may further include, that the control method comprises providing the timestamp pulse to the device clock for use in synchronization with the reference clock.

In Example 51, the subject matter of one of the examples 49 to 50 or any of the Examples described herein may further include, that the control method comprises providing the timestamp pulse to a symbol timing component of the device, for use in a determination of the trigger time to use for the sequence of symbols.

In Example 52, the subject matter of one of the examples 41 to 51 or any of the Examples described herein may further include, that the symbol is an Orthogonal Frequency Division Multiplex, OFDM, symbol, and/or wherein the signal comprises a sequence of OFDM symbols.

In Example 53, the subject matter of one of the examples 41 to 52 or any of the Examples described herein may further include, that the device is a cable modem of a cable communication network (200).

In Example 54, the subject matter of example 53 or any of the Examples described herein may further include, that the impulse response peak is identified for an OFDM channel of the cable communication network.

In Example 55, the subject matter of one of the examples 41 to 54 or any of the Examples described herein may further include, that the master device comprises a cable modem termination system.

In Example 56, the subject matter of one of the examples 41 to 55 or any of the Examples described herein may further include, that the multi-path channel comprises a hybrid fiber coaxial cable.

Example 57 relates to a cable modem (220) being configured to perform the control method according to one of the examples 41 to 56, the cable modem being the device.

Example 58 relates to a cable communication system (200) comprising the cable modem (220) according to example 57.

In Example 59, the subject matter of example 58 or any of the Examples described herein may further include the master device (210).

In Example 60, the subject matter of example 59 or any of the Examples described herein may further include, that the master device comprises a cable modem termination system of the cable communication network.

Example 61 relates to a machine-readable storage medium including program code, when executed, to cause a machine to perform the method of one of the examples 41 to 56.

Example 62 relates to a computer program having a program code for performing the method of one of the examples 41 to 56, when the computer program is executed on a computer, a processor, or a programmable hardware component.

Example 63 relates to a machine-readable storage including machine readable instructions, when executed, to implement a method or realize an apparatus as claimed in any pending claim or shown in any example.

Example A1 is a method configured to synchronize a device clock in a device with a reference clock in a master device, wherein the device and the master device are connected by a multipath channel. The method includes receiving, with the device, a signal from the master device, wherein the signal includes a series of symbols; determining a channel frequency response of the multi-path channel based on the signal; transforming the channel frequency response to a channel impulse response; identifying a peak in the channel impulse response; determining a timestamp offset time between the peak and a trigger time indicative of a beginning of a symbol in the signal; and synchronizing the device clock based on the timestamp offset time.

Example A2 includes the subject matter of Example A1, including or omitting optional elements, further including, before transforming the channel frequency response, interpolating across excluded subcarriers in the channel frequency response; smoothing edges of a contiguous part of the channel frequency response; and zero padding the contiguous part to cover a desired bandwidth.

Example A3 includes the subject matter of Example A1, including or omitting optional elements, further including generating a timestamp pulse at a time corresponding to the trigger time delayed by the timestamp offset time; and providing the timestamp pulse to the device clock for use in synchronization with the reference clock.

Example A4 includes the subject matter of Example A1, including or omitting optional elements, wherein the symbol includes an OFDM symbol.

Example A5 includes the subject matter of Example A1, including or omitting optional elements, wherein the device includes a cable modem.

Example A6 includes the subject matter of Example A1, including or omitting optional elements, wherein the master device includes a cable modem termination system.

Example A7 includes the subject matter of Example A1, including or omitting optional elements, wherein the multi-path channel includes a hybrid fiber coaxial cable.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general-purpose processor executing instructions stored in computer readable medium.

The above description of illustrated examples of the subject disclosure, including what is described in the Abstract, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize.

In this regard, while the disclosed subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A control apparatus for synchronizing a device clock in a device with a reference clock in a master device, wherein the device and the master device are connected by a multi-path channel, the control apparatus comprising processing circuitry being configured to:
   obtain information a channel frequency response of the multi-path channel, the channel frequency response being based on a signal comprising a sequence of symbols;
   transform the channel frequency response into a channel impulse response;
   identify a peak in the channel impulse response;
   determine a timestamp offset time between the peak in the channel impulse response and a trigger time indicative of a beginning of a symbol in the signal; and
   synchronize the device clock based on the timestamp offset time.

2. The control apparatus according to claim 1, wherein the peak in the channel impulse response is indicative of a direct path within the multi-path channel.

3. The control apparatus according to claim 1, wherein the processing circuitry is configured to interpolate across excluded subcarriers in the channel frequency response.

4. The control apparatus according to claim 1, wherein the processing circuitry is configured to identify a contiguous part of the channel frequency response.

5. The control apparatus according to claim 4, wherein the processing circuitry is configured to smooth edges of the contiguous part of the channel frequency response.

6. The control apparatus according to claim 4, wherein the processing circuitry is configured to zero-pad the contiguous part of the channel frequency response.

7. The control apparatus according to claim 4, wherein the contiguous part of the channel frequency response is larger than other contiguous parts of the channel frequency response.

8. The control apparatus according to claim 4, wherein the processing circuitry is configured to transform the channel frequency response into the channel impulse response by performing an inverse Fourier transform on the contiguous part of the channel frequency response.

9. The control apparatus according to claim 1, wherein the processing circuitry is configured to generate a timestamp pulse at a time corresponding to the trigger time delayed by the timestamp offset time.

10. The control apparatus according to claim 9, wherein the processing circuitry is configured to provide the timestamp pulse to the device clock for use in synchronization with the reference clock.

11. The control apparatus according to claim 9, wherein the processing circuitry is configured to provide the timestamp pulse to a symbol timing component of the device, for use in a determination of the trigger time to use for the sequence of symbols.

12. The control apparatus according to claim 1, wherein the symbol is an Orthogonal Frequency Division Multiplex, OFDM, symbol, and/or wherein the signal comprises a sequence of OFDM symbols.

13. The control apparatus according to claim 1, wherein the device is a cable modem of a cable communication network.

14. The control apparatus according to claim 13, wherein the impulse response peak is identified for an OFDM channel of the cable communication network.

15. The control apparatus according to claim 1, wherein the master device comprises a cable modem termination system.

16. The control apparatus according to claim 1, wherein the multi-path channel comprises a hybrid fiber coaxial cable.

17. A cable modem comprising the control apparatus according to claim 1, the cable modem being the device.

18. A cable communication system comprising the cable modem according to claim 17.

19. The cable communication system according to claim 18 further comprising the master device.

20. The cable communication system according to claim 19, wherein the master device comprises a cable modem termination system of a cable communication network.

21. A control device for synchronizing a device clock in a device with a reference clock in a master device, wherein the device and the master device are connected by a multi-path channel, the control device comprising processing means being configured to execute operations to cause the control device to:
   obtain information a channel frequency response of the multi-path channel, the channel frequency response being based on a signal comprising a sequence of symbols;
   transform the channel frequency response into a channel impulse response;
   identify a peak in the channel impulse response;
   determine a timestamp offset time between the peak in the channel impulse response and a trigger time indicative of a beginning of a symbol in the signal; and
   synchronize the device clock based on the timestamp offset time.

22. A control method for synchronizing a device clock in a device with a reference clock in a master device, the method comprising:
   obtaining information a channel frequency response of a multi-path channel, the channel frequency response being based on a signal comprising a sequence of symbols;
   transforming the channel frequency response into a channel impulse response;
   identifying a peak in the channel impulse response;
   determining a timestamp offset time between the peak in the channel impulse response and a trigger time indicative of a beginning of a symbol in the signal; and
   synchronizing the device clock based on the timestamp offset time.

23. A non-transitory computer readable medium having stored thereon program code for performing the method of claim 22.

* * * * *